United States Patent [19]

Froberg

[11] 4,282,018

[45] Aug. 4, 1981

[54] GLASS MANUFACTURING PROCESS WITH IN-SITU COLEMANITE CALCINATION

[75] Inventor: Magnus L. Froberg, Granville, Ohio

[73] Assignee: Owens-Corning Fiberglas Corporation, Toledo, Ohio

[21] Appl. No.: 137,684

[22] Filed: Apr. 7, 1980

[51] Int. Cl.³ .................. C03B 1/00; C03B 3/00; C03C 1/02; C03C 3/08
[52] U.S. Cl. ........................... 65/27; 65/335; 106/54; 106/DIG. 8; 423/279
[58] Field of Search ............ 65/27, 335; 106/DIG. 8, 106/54; 423/279

[56] References Cited

U.S. PATENT DOCUMENTS

| | | | |
|---|---|---|---|
| 3,309,170 | 3/1967 | Griswold | 423/279 |
| 3,865,541 | 2/1975 | Wilson et al. | 432/13 |
| 4,074,990 | 2/1978 | Brzozowski et al. | 65/27 |
| 4,184,861 | 1/1980 | Erickson | 65/27 |

OTHER PUBLICATIONS

"Guidebook: Las Vegas to Death Valley and Return", Nevada Bureau of Mines and Geology, Report 26, University of Nevada-Reno, 1975.

Primary Examiner—Richard V. Fisher
Attorney, Agent, or Firm—Ronald C. Hudgens; Patrick P. Pacella; Robert F. Rywalski

[57] ABSTRACT

An improvement is provided in glass manufacturing processes of the type wherein combustion products are passed upwardly and in countercurrent flow through a bed of gravitationally downwardly moving agglomerates of glass forming batch constituents. The improvement resides in utilizing excess sensible heat in the combustion products by passing raw colemanite through such a bed in indirect heat exchange contact with the combustion products so as to heat such colemanite to a temperature in excess of that needed to release its chemically bound water and then employing such colemanite as a batch ingredient.

4 Claims, 1 Drawing Figure

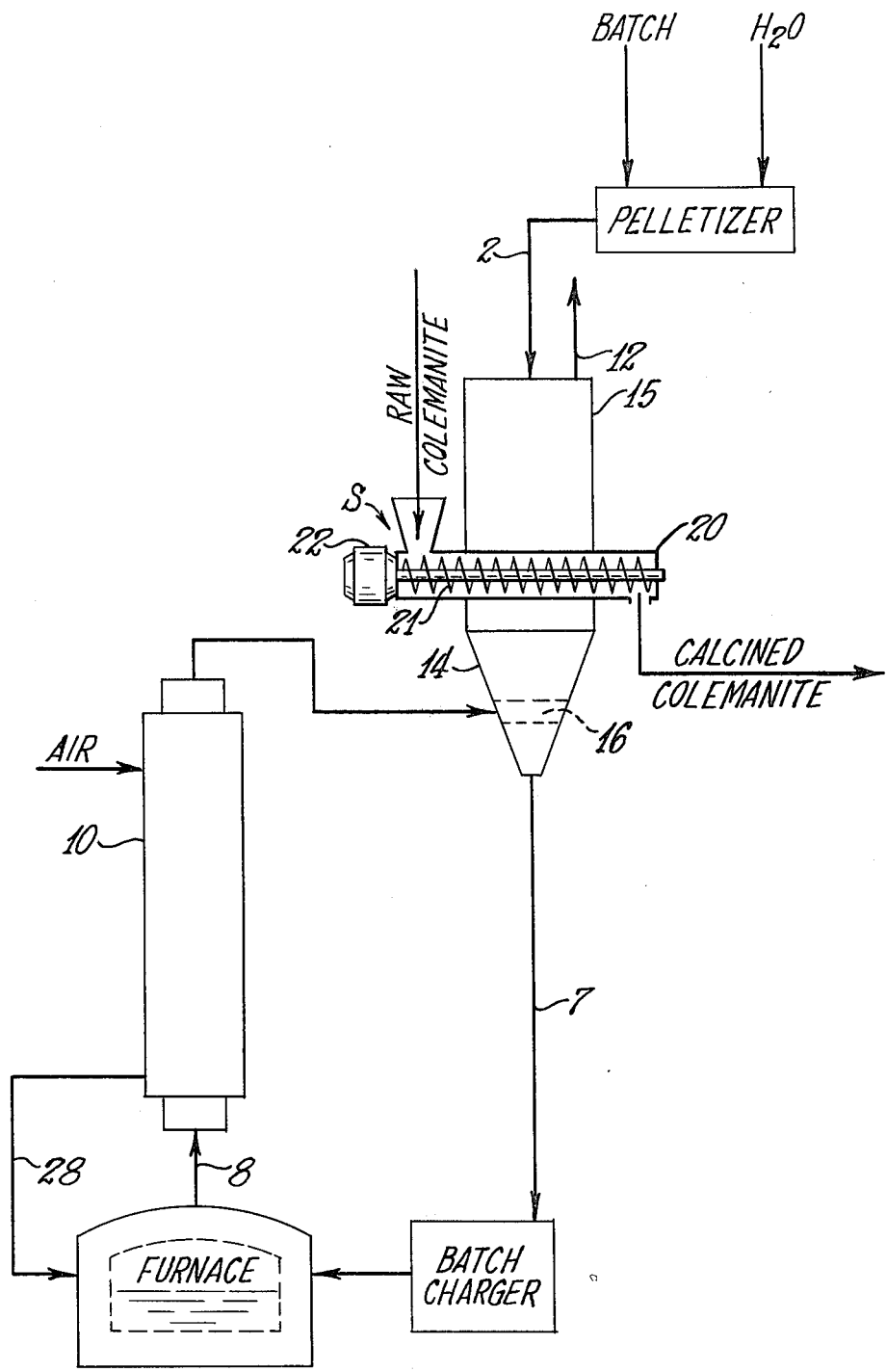

GLASS MANUFACTURING PROCESS WITH IN-SITU COLEMANITE CALCINATION

TECHNICAL FIELD

The present invention relates to the art of glass manufacturing. More particularly, this invention relates to an improved process which minimizes the amount of energy which is wasted by discharge to the atmosphere and which minimizes atmospheric pollution.

BACKGROUND AND SUMMARY

In U.S. Pat. No. 4,184,861 which is hereby incorporated by reference, a process is disclosed for manufacturing a $B_2O_3$ and CaO containing glass. The process essentially comprises converting glass forming batch ingredients, including calcined colemanite, into agglomerates, heating a bed of such agglomerates in a chamber by direct contact with gaseous combustion products so as to produce heated non-aggregated agglomerates and then supplying such agglomerates to a glass melting furnace. That patent also recognizes that there may be excess sensible heat in the combustion products which are passed through the bed of agglomerates and in order to recover some of that sensible heat, a heat exchanger is provided in the chamber containing the bed of agglomerates. Such process has also been practiced in the past by diluting the combustion products with ambient air to decrease the temperature of the gases leaving the bed-containing chamber.

It is also known in the art that when manufacturing such $B_2O_3$ and CaO containing glasses, it is necessary that calcined colemanite be employed. Otherwise should the raw colemanite be employed there is a severe danger that when the agglomerates are heated they will disintegrate because of the violent release of the chemically bound water in the raw colemanite. Such water release will generally occur when the colemanite is heated to a temperature in excess of its decrepitation temperature, which typically is somewhere in excess of about 390° C. Since it is desirable to heat the agglomerates to as high a temperature as possible but yet without causing the agglomerates to aggregate into a mass as, for example, would ocur if they were heated in excess of their melting or softening point, it has been necessary in the past to either purchase such calcined colemanite or to separately treat such colemanite prior to use. Obviously such additional treatment serves to increase the raw material costs of the batch and consequently the entire glass manufacturing process.

The present invention recognizes this deficiency and has as its object to provide for a more economical glass manufacturing process.

More specifically, the present invention provides for a glass manufacturing process which includes an in-situ calcination of colemanite to thereby take advantage of the excess sensible heat in combustion products and minimize raw material costs. Even yet more specifically, the present invention provides for an improvement in the above type indicated process by passing raw colemanite through the chamber containing the bed of agglomerates with the raw colemanite being passed through the chamber in indirect heat exchange relation to the combustion products and the agglomerates of the bed so as to heat the raw colemanite to a temperature in excess of its decrepitation temperature and then withdrawing the decrepitated, or calcinated colemanite, from the chamber. Such withdrawn or calcined colemanite then may be employed to supply at least a portion of the calcined colemanite needed for the batch.

THE DRAWING

The attached drawing schematically illustrates the manner in which the present invention may be industrially exploited.

DESCRIPTION

The present invention is broadly applicable to the manufacture of a wide variety of glasses containing calcia and boric oxide. Should any of such glasses contain alkali metal oxide in an amount greater than about 5% by weight, it is preferred to dry and preheat batch agglomerates of such glasses in accordance with U.S. Ser. Nos. 095,870 and 095,871, both filed Nov. 19, 1979. The present invention however, is outstandingly adapted for the manufacture of an E-type glass which may be categorized as an alkaline earth boroaluminosilicate glass. The preferred form of agglomerates are pellets but it will be appreciated that any form of agglomerates may be employed. Such agglomerates are composite, integral, self supporting masses consisting essentially of all the substantial batch ingredients and may take the form of balls, extrusions, disks, and briquettes.

Referring now to the drawing, it will be seen that glass forming batch materials and water are converted into agglomerates, preferably pellets on a rotating disk pelletizer. As indicated, one of the batch ingredients is calcined colemanite. The free water content of the pellets may be about 10 to 20% by weight and while not shown, the pellets may be subjected to a screening operation to select pellets of a desired size for example a nominal size of about $\frac{3}{8}$ inch to about $\frac{3}{4}$ inch. These pellets are then transported by suitable means 2 such as a belt conveyor, and supplied to a chamber 15 in which the pellets by direct contact with combustion products are dried and preheated to an elevated temperature, preferably a temperature in excess of 500° C. Chamber 15 maintains a vertical bed of pellets in which the pellets generally move gravitationally downwardly and are discharged therefrom as hot individual pellets and supplied by suitable means, for example a duct member 7, to a batch charger. The batch charger then conveys the heated pellets to, preferably, a combustion fired glass melting furnace. The combustion products of the melting furnace, or flue gases, are conveyed by suitable means 8, for example, a short duct to a recuperator 10 where they are indirectly cooled with air, for example from a temperature of about 2600° F. to a temperature on the order of about 1400° F.–1500° F. The heated air 28 is then provided to the furnace burners and used as combustion make up air. Such cooled combustion products, or flue gases, are then conveyed by suitable duct means to chamber 15 where they flow in direct contact with the pellets in countercurrent flow fashion to dry the pellets and preheat them. The flue gases leave the pellet heater through a suitable outlet 12. Preferably the flue gases will be supplied to the pellet heater or chamber 15 by a manifold type arrangement with entrances into the chamber being on diametrically opposed sides of a lower frusto-conical portion 14 of chamber 15. In accordance with sound engineering practices the gases will be distributed generally uniformly across the heater as by employing an inverted V-shaped member 16 which spans frusto-conical portion 14.

Raw colemanite is passed through the chamber in indirect heat exchange contact with both the bed of pellets therein and the combustion products flowing therethrough. Any suitable means may be employed for this purpose. Suitably such raw colemanite will be passed through the chamber by the use of a screw conveyor generally designated S in the drawings. Such screw conveyor extends through the chamber and may be positioned substantially anywhere within the chamber so long as the position where it is located is such that the temperature of the colemanite will exceed its decrepitation temperature that is, the temperature at which its chemically bound water is released which temperature typically is in excess of about 390° C. The conveyor includes screw flights 21 which are housed within a barrel 20 with the flights or screws being driven by any suitable means such as a motor 22. Raw colemanite is fed into the inlet of the screw conveyor, passed through the chamber and then withdrawn from the screw conveyor as calcined colemanite. Preferably a plurality of screw conveyors will be employed. The size of the raw colemanite which is fed through the screw conveyor is not critical but suitably will be on the order of about 1 inch or less. Thus from the foregoing it will be seen that excess sensible heat in the gases will be indirectly transferred through barrel 20 to the raw colemanite so as to heat such colemanite to an excess of its decrepitation temperature and thereby provide for calcined colemanite and the recovery of excess heat values. Desirably the system will be operated such that the temperature of the gases leaving in duct 12 will be less than about 400° F. and preferably less than 300° F. Such calcined colemanite is then employed in the manufacture of the pellets.

While the above sets forth the present invention, it will be of course be apparent that modifications are possible which pursuant to the patent statutes and laws do not depart from the spirit and scope thereof.

I claim:

1. In a process for manufacturing a $B_2O_3$ and $CaO$ containing glass comprising converting glass forming batch ingredients, including calcined colemanite, into agglomerates, heating a bed of said agglomerates in chamber by direct contact with gaseous combustion products so as to produce heated, non-aggregated agglomerates and supplying said agglomerates to a glass melting furnace, the improvement comprising passing raw colemanite through said chamber and in indirect heat exchange relation to said combustion products so as to heat said raw colemanite to a temperature in excess of its decrepitation temperature and withdrawing said heated colemanite from said chamber.

2. The improvement of claim 1 and further comprising using said withdrawn colemanite as a batch ingredient.

3. The process of claim 1 wherein said furnace is a combustion-fired furnace and said combustion products are the flue gases from said furnace.

4. The improvement of claim 1 wherein said raw colemanite is passed through said chamber with a screw conveyor.

* * * * *